(12) United States Patent
Nagata

(10) Patent No.: US 8,091,247 B2
(45) Date of Patent: Jan. 10, 2012

(54) GEAR SHAPE MEASURING APPARATUS

(75) Inventor: Eiri Nagata, Toyoake (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/069,953

(22) Filed: Mar. 23, 2011

(65) Prior Publication Data
US 2011/0232116 A1    Sep. 29, 2011

(30) Foreign Application Priority Data

Mar. 29, 2010   (JP) ................................. 2010-076234

(51) Int. Cl.
*G01B 5/08*     (2006.01)

(52) U.S. Cl. ............... 33/501.13; 33/501.11; 33/501.19; 73/162

(58) Field of Classification Search .... 33/501.7–501.19, 33/613, 626; 73/162; 451/47
See application file for complete search history.

(56) References Cited

U.S. PATENT DOCUMENTS

| | | | |
|---|---|---|---|
| 3,381,386 A * | 5/1968 | Stenholm ................... 33/501.19 |
| 3,992,937 A | 11/1976 | Jaeger et al. |
| 4,488,359 A | 12/1984 | Misson |
| 4,799,337 A | 1/1989 | Kotthaus |
| 5,016,471 A | 5/1991 | Och |
| 5,307,676 A | 5/1994 | Gutman |
| 5,396,711 A | 3/1995 | Iwasaki et al. |
| 5,505,003 A * | 4/1996 | Evans et al. ................... 33/501.7 |
| 5,513,442 A * | 5/1996 | Flair ........................... 33/501.19 |
| 5,901,454 A | 5/1999 | Stadtfeld et al. |
| 6,370,786 B2 * | 4/2002 | Ishii ........................... 33/501.12 |
| 6,752,695 B2 * | 6/2004 | Schmid ........................... 451/47 |
| 7,134,215 B2 * | 11/2006 | Looser et al. ............... 33/501.11 |
| 7,426,777 B2 * | 9/2008 | Nagata et al. ................. 451/219 |
| 7,716,844 B2 * | 5/2010 | Pommer .................... 33/501.19 |
| 7,748,131 B2 * | 7/2010 | Finkenwirth et al. ....... 33/501.13 |
| 7,775,101 B2 * | 8/2010 | Baruchello ..................... 73/162 |
| 2002/0129647 A1 | 9/2002 | Bartelt et al. |
| 2003/0166377 A1 * | 9/2003 | Schmid ............................. 451/5 |

(Continued)

FOREIGN PATENT DOCUMENTS

JP     5-209703     8/1993

(Continued)

OTHER PUBLICATIONS

Extended European Search Report issued Jul. 6, 2011, in European Patent Application No. 11159507.0.

*Primary Examiner* — Yaritza Guadalupe-McCall
(74) *Attorney, Agent, or Firm* — Oblon, Spivak, McClelland, Maier & Neustadt, L.L.P.

(57) ABSTRACT

A gear shape measuring apparatus includes a supporting unit adapted to support a test gear so as to be rotatably driven about a first rotation axis, a gauge gear being rotatable about a second rotation axis while engaging with the test gear, an inter-axis angle setting portion for adjusting and setting a relative inclination angle between the first rotation axis and the second rotation axis, and allowing a distance between the first rotation axis and the second rotation axis to be changed, a biasing member biasing the gauge gear against the test gear, a center-to-center distance measuring portion measuring the distance between the first rotation axis and the second rotation axis, and a measurement data processing portion processing a measurement data.

10 Claims, 3 Drawing Sheets

U.S. PATENT DOCUMENTS

| | | | |
|---|---|---|---|
| 2005/0262715 A1* | 12/2005 | Looser et al. | 33/501.11 |
| 2006/0264155 A1 | 11/2006 | Kobialka | |
| 2007/0214643 A1* | 9/2007 | Nagata et al. | 29/893.35 |
| 2011/0179659 A1* | 7/2011 | Yuzaki | 33/501.9 |

FOREIGN PATENT DOCUMENTS

| | | |
|---|---|---|
| JP | 6-55341 | 3/1994 |
| JP | 2001-47313 | 2/2001 |
| JP | 2006-326825 | 12/2006 |

* cited by examiner

GEAR SHAPE MEASURING APPARATUS

CROSS REFERENCE TO RELATED APPLICATIONS

This application is based on and claims priority under 35 U.S.C. §119 to Japanese Patent Application 2010-076234, filed on Mar. 29, 2010, the entire content of which is incorporated herein by reference.

TECHNICAL FIELD

This disclosure relates to a gear shape measuring apparatus.

BACKGROUND DISCUSSION

Gears are usually made by performing a cutting work on a gear material, where the gear teeth are cut and formed by using a gear hobbing machine, or by performing a roll forming, where a round die or a flat die is pushed against the gear material to form the gear teeth. The cutting or forming process may include an error of a shape of a working tool, an operating error of a machining tool, an error of an installation position of the gear material or changes in cutting or forming environment. As a result, a geometric shape of the finished gear may include some errors. This may cause an error of a tooth thickness or runout of a tooth space of the gear, which may cause a backlash between mating gears or a decreased transmission efficiency, resulting in a short life of the gear. Therefore, it is important to inspect a tooth profile of the finished gear when, in particular, a high precision is required.

According to a known technique for inspecting gears disclosed in JPH5-209703, a pair of gauge heads is provided in a manner that a space between the gauge heads is increased or decreased by means of a driving device. For measuring a tooth thickness, a gear to be tested is placed so that plural teeth of the gear are sandwiched by the gauge heads at a time. According to the measuring device employing the technique disclosed in JPH5-209703, various kinds of gears each having a different specification are measured by using an identical measuring device. Specifically, the pair of gauge heads formed so as to have ridge-like lines arranged parallel to each other is arranged in a manner that the space between the gauge heads is increased or decreased. The pair of gauge heads makes contact with the plural teeth so that the plural teeth are sandwiched by the gauge heads at a time. A distance, which is perpendicular to the axis, across several teeth sandwiched by the gauge heads, that is, a sector span, is obtained by measuring a distance between the two gauge heads. By using this measuring device, the geometric shape of the gear is measured without using a master gear or the like, which spares a set-up time of the master gear. As a result, measurement efficiency is improved (refer to paragraphs 0023 to 0025, and FIG. 1 of JPH5-209703).

According to the known technique for inspecting gears disclosed in JPH5-209703, various kinds of gears each having a different specification are measured without using the master gear or the like. However, the gauge heads are made contact with particular two teeth among the teeth of the gear to be tested. Errors related to the gear, including an error of the tooth thickness, are not identical along a circumference of the gear. Therefore, the geometric shape of the finished entire gear is not determined even if the geometric shape of a particular portion of the gear is measured. In order to measure the geometric shapes of all the individual teeth of the gear by using the measuring device according to JPH5-209703, the measuring work may be complicated. In addition, the measuring device according to JPH5-209703 provides an approximate tooth thickness by measuring the distance between the two teeth, however, it may not be determined whether or not the entire gear is made into an intended shape. In case that the gear to be tested has a small-module, a small pressure angle or a large number of teeth, the measuring work may be even more difficult. As mentioned above, the gear shape measuring apparatus disclosed in JPH5-209703 may involve the complicated measuring work for grasping the geometric shape of the entire gear and there might be room for improvement.

A need thus exists for a gear shape measuring apparatus which is not susceptible to the drawback mentioned above.

SUMMARY

According to an aspect of this disclosure, a gear shape measuring apparatus includes a supporting unit adapted to support a test gear so as to be rotatably driven about a first rotation axis, a gauge gear being rotatable about a second rotation axis while engaging with the test gear, an inter-axis angle setting portion for adjusting and setting a relative inclination angle between the first rotation axis and the second rotation axis, and allowing a distance between the first rotation axis and the second rotation axis to be changed, a biasing member biasing the gauge gear against the test gear, a center-to-center distance measuring portion measuring the distance between the first rotation axis and the second rotation axis, and a measurement data processing portion processing a measurement data.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION (Overview) A completed toothed gear (hereinafter referred to as a gear) includes various errors related to a geometric shape of the gear, including a tooth thickness but not limited thereto, even though the gear undergoes a finishing process. These errors are attributed to, for example, an error of a tooth thickness or a wear of a cutter used as a tool, a thermal displacement of a cutter head and a work table, a deformation occurring at portions of the tool or a jig due to a load applied during a machining, cutting or other process, a thermal expansion of a gear to be processed that is caused by a temperature increase during the process, a periodic error of the tooth thickness caused by using a multi-tooth cutter, or the like. For a gear with which an extra accuracy is expected, an accurate processing is required, and in addition, a post-manufacture inspection is important. This disclosure is related to a gear shape measuring apparatus that inspects a test gear 1, that is, a gear to be tested, easily and accurately. Embodiments of this disclosure will be explained hereunder with reference to FIGS. 1 to 4.

Figure 1:
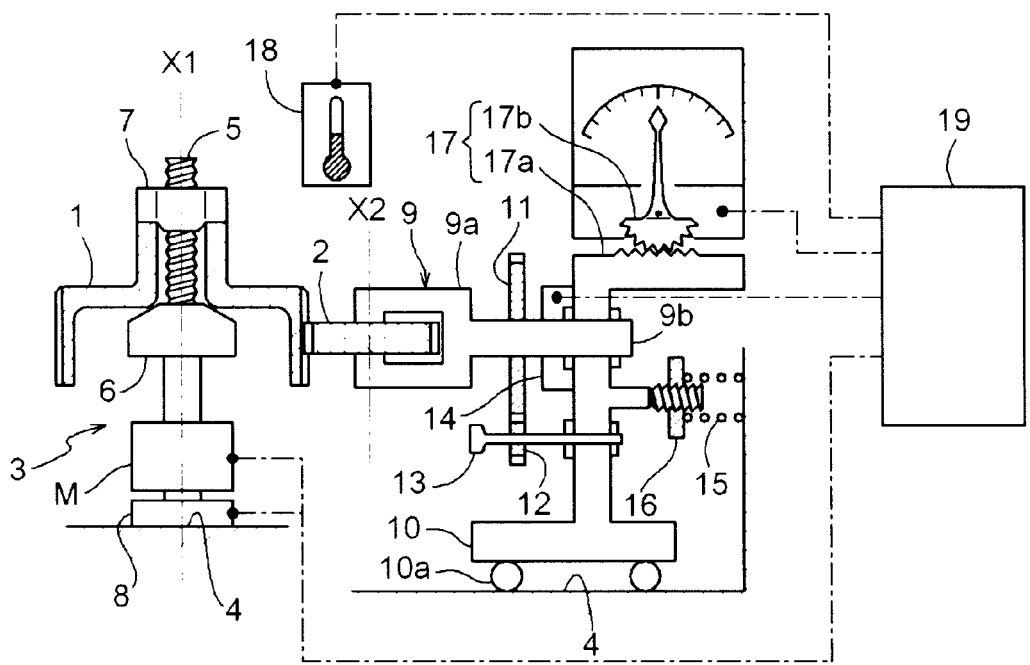
FIG. 1 is a schematic view of a structure of a gear shape measuring apparatus according to embodiments of this disclosure.

As shown in FIG. 1, the test gear 1 finished with the finishing process is securely mounted on a supporting unit 3 on which an inspection is conducted. The supporting unit 3 is provided at a first portion of a base 4 and includes a support shaft 5 extending in a vertical direction and a boss portion 6 provided at a base end portion of the support shaft 5. The boss portion 6 may be replaced by another boss portion 6 according to a geometric shape of the test gear 1 to be mounted on the supporting unit 3, or alternatively, may be constituted by using an expandable mandrel or the like. The test gear 1 is inserted around the support shaft 5, mounted on the boss portion 6 and is then secured on the boss portion 6 with a nut 7 threaded onto a distal end portion of the support shaft 5. An upper surface of the boss portion 6 and a lower surface of the nut 7 each includes a tapered portion. Thus, a first rotation axis X1 of the test gear 1 coincides with a rotation axis of the support shaft 5 in a state where the nut 7 is tightened. A motor M for rotating the support shaft 5 is mounted on the support shaft 5, at a portion closer to the base end portion of the support shaft 5. The motor M is provided with a measuring instrument 8 including a potentiometer, for measuring a rotation angle of the motor M.

A gauge gear 2 to be engaged with the test gear 1 is provided at a second portion of the base 4. An engaging attitude of the gauge gear 2 relative to the test gear 1 is changeable. In other words, a second rotation axis X2 of the gauge gear 2 is adjustable so as to be positioned parallel or inclined to the first rotation axis X1 of the test gear 1. A state where the second rotation axis X2 is parallel to the first rotation axis X1 refers to a standard attitude. The standard attitude is established by rotating either one of the first rotation axis X1 and the second rotation axis X2 in a vertical direction relative to a plane that includes the first rotation axis X1 and the second rotation axis X2.

The gauge gear 2 is supported by an inter-axis angle setting portion 9. The inter-axis angle setting portion 9 includes a gear axis supporting portion 9a supporting the gauge gear 2. The inter-axis angle setting portion 9 is provided with, for example, a fork-shaped member. The gear axis supporting portion 9a is provided, for example, at a first end portion of the fork-shaped member. The gauge gear 2 is not limited to a particular type, however, it is desirable that a tooth profile of the gauge gear 2 matches a tooth profile of the test gear 1. In other words, when the second rotation axis X2 that is parallel to the first rotation axis X1 is made inclined relative to the second rotation axis X2 up to a predetermined angle, the gauge gear 2 and the test gear 1 need to engage with each other so that a rotation of the test gear 1 is transmitted to the gauge gear 2, thereby reliably rotating the gauge gear 2.

A base end axis supporting portion 9b is provided at a second end portion of the fork-shaped member. The base end axis supporting portion 9b is rotatably mounted on a sliding portion 10 that moves relative to the base 4 of the gear shape measuring apparatus, and thus the gear axis supporting portion 9a is supported on the sliding portion 10 by the base end axis supporting portion 9b. A large diameter gear 11 for an angle adjustment is provided at the base end axis supporting portion 9b for an angle adjustment. An adjustment dial 13 provided with a small diameter gear 12 for rotating the large diameter gear 11 is mounted on the sliding portion 10. The large diameter gear 11 has a greater number of teeth than the small diameter gear 12. By rotating the adjustment dial 13, the gauge dial 2 is inclined by a minute angle, that is, the second rotation axis X2 is inclined by a minute angle. A measuring instrument 14, including a potentiometer for measuring a rotation angle of the adjustment dial 13 or of the base end axis supporting portion 9b, is provided at the sliding portion 10.

FIG. 1 schematically shows each portion of the inter-axis angle setting portion 9. For measuring the test gear 1 having an extremely fine tooth profile and requiring a precision, it is desirable that an inclination angle of the second rotation axis X2 relative to the first rotation axis X1, that is, a relative inclination angle between the first rotation axis X1 and the second rotation axis X2, is adjusted at a pitch of approximately a hundredth angle. A detection value obtained by the measuring instrument 14 is used in a measurement work of the tooth profile, which will be explained later.

The base end axis supporting portion 9b is structured so that a rotation axis of the base end axis supporting portion 9b intersects with the second rotation axis X2 at a central location of the gauge gear 2 in a face width direction of the gauge gear 2, and intersects with the first rotation axis X1. Due to this structure, the base end axis supporting portion 9b is always maintained so that the rotation axis thereof is perpendicular to the first rotation axis X1 and to the second rotation axis X2. Thus, even when the inclination angle of the gauge gear 2, that is, the inclination angle of the second rotation axis X2 relative to the first rotation axis X1, is changed, a position where the test gear 1 and the gauge gear 2 come in contact with each other remains unchanged, and thus the inclination angle between the second rotation axis X2 of the gauge gear 2 and the first inclination angle X1 of the test gear 1 is changed in the smoothest manner. In addition, when the inter-axis angle setting portion 9 moves close to or away from the test gear 1, a direction in which the inter-axis angle setting portion 9 moves close to the test gear 1 is perpendicular to the first rotation axis X1 and to the second rotation axis X2. Thus, a measurement result obtained by a center-to-center distance measuring portion 17 as it is, refers to a distance between the first rotation axis X1 and the second rotation axis X2, which makes a calculation to be performed later simple.

The sliding portion 10 is movable by means of a sliding roller 10a provided between the sliding portion 10 and the base 4 of the gear shape measuring apparatus. The sliding portion 10 moves in a direction in which the second rotation axis X2 moves close to or away from the first rotation axis X1. The sliding portion 10 is movable in an extremely smooth manner so as to respond to even a minor change in the distance between the first rotation axis X1 and the second rotation axis X2. The sliding portion 10 is required to move precisely, therefore, for example, a precision linear guide or the like may be used.

A biasing member 15 is provided for biasing or pushing the gauge gear 2 against the test gear 1 when measuring the test gear 1. The biasing member 15 includes, for example, a coil spring positioned between the base 4 and the sliding portion 10 of the gear shape measuring apparatus. The biasing member 15 is provided with a biasing force adjusting mechanism 16 for adjusting the biasing force of the biasing member 15. The biasing force of the biasing member 15 is adjusted by rotating a member, which is included in a mounting seat of the spring coil and is provided at the sliding portion 10, relative to a spring attachment screw. Thus, the biasing force pushing the gauge gear 2 against the test gear 1 may be set at an optimal setting in response to changes in an outer diameter or a tooth depth of the test gear 1. In accordance with the tooth profile of the test gear 1, the biasing force may be set at an extremely small value. Therefore, other biasing methods, for example, a leaf spring or a method employing a magnetic attraction or repulsion may be used instead of the coil spring.

The sliding portion 10 includes the center-to-center distance measuring portion 17 for measuring the distance between the first rotation axis X1 and the second rotation axis X2 which changes as the sliding portion 10 moves relative to the base 4. As shown in FIG. 1, the center-to-center distance measuring portion 17 is constituted by, for example, a dial gauge mechanism or the like. The dial gauge mechanism includes a rack gear 17a provided at the sliding portion 10 and an indicator 17b that engages with the rack gear 17a and pivots relative to the rack gear 17a. A member for measuring a pivoting angle of the indicator 17b, such as, for example, a potentiometer is provided at a pivoting portion of the indicator 17b. Thus, the geometric shape of the test gear 1 is visually confirmed by means of the indicator 17b when testing the test gear 1. In addition, a data processing is performed efficiently as will be explained later. The center-to-center distance measuring portion 17 may be constituted by a contact-type linear gauge or a non-contact-type optical distance measurement instrument which will be explained later because a value to be measured by the center-to-center distance measuring portion 17 is extremely minute.

A temperature measuring portion 18 is provided at a vicinity of the test gear 1 and the gauge gear 2. Thus, an amount of deformation of the test gear 1 and the gauge gear 2 due to temperature changes is corrected. Data obtained by the temperature measuring portion 18, that is, an output from the temperature measuring portion 18, is organized so as to be taken out of the temperature measuring portion 18 in a form of a signal.

The motor M, the center-to-center distance measuring portion 17, the inter-axis angle setting portion 9 and the temperature measuring portion 18 are connected to a measurement data processing portion 19 in a manner that the data obtained by the motor M, the center-to-center distance measuring portion 17, the inter-axis angle setting portion and the temperature measuring portion 18 is transmitted to the measurement data processing portion 19. Thus, the rotation angle of the motor M, the distance between the first rotation axis X1 and the second rotation axis X2, the inclination angle of the second rotation axis X2 relative to the first rotation axis X1, and measurement values of the ambient temperature, including, the temperatures of the test gear 1 and the gauge gear 2, are automatically stored in the measurement data processing portion 19, and used for an arithmetical computation of a tooth profile.

The geometric shape of the gauge gear 2 to be used for the measurement may vary in accordance with the geometric shape of the test gear 1. For example, the gauge gear 2 whose basic specification, including module, tooth depth or the like, may be identical to that of the test gear 1. The geometric shape of the gauge gear 2 needs to be chosen so that the gauge gear 2 engages with and rotates with the test gear 1 reliably.

Figure 2:
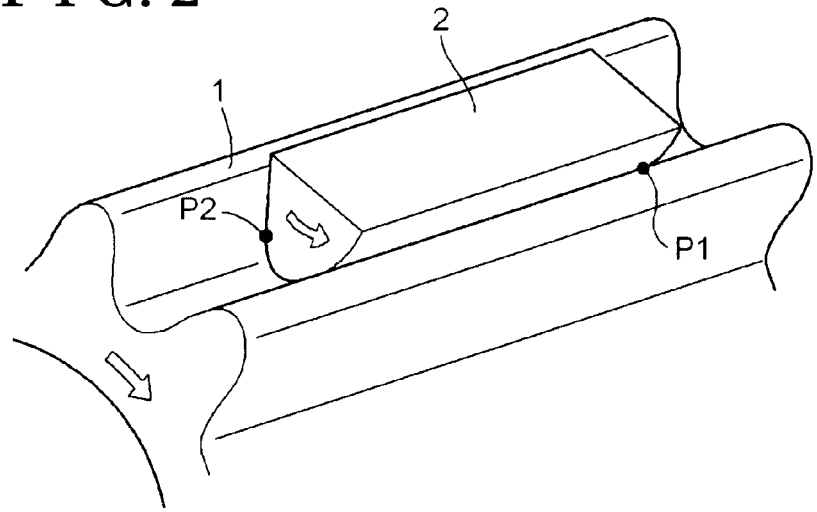
FIG. 2 is a view explaining an engagement between a test gear and a gauge gear according to the embodiments.

(An example of the gauge gear 2) A geometric shape of each tooth of the gauge gear 2 may have, for example, a rectangular-shaped cross section when a tooth of the gauge gear 2 is cut on a cylindrical surface in a circumferential direction of the gauge gear 2. When the gauge gear 2 having the rectangular-shaped cross section as explained above is made inclined relative to the test gear 1 and made contact with the test gear 1 that has an identical cross section with that of the gauge gear 2, the distance between the first rotation axis X1 and the second rotation axis X2 is changed by a large extent in response to the change in the inclination angle of the second rotation axis X2 relative to the first rotation axis X1. As a result, a measuring accuracy improves. The test gear 1 and the gauge gear 2 are closest to each other when the first rotation axis X1 and the second rotation axis X2 are parallel to each other. However, when the first rotation axis X1 and the second rotation axis X2 are inclined relative to each other, there arises a state where the teeth of the test gear 1 and the teeth of the gauge gear 2 do not engage with each other deep enough, which increases the distance between the first rotation axis X1 and the second rotation axis X2. In this state, as shown in FIG. 2, a front flank and a rear flank of one of the teeth of the gauge gear 2 are in contact with two of the teeth of the test gear 1 respectively. The front and rear are based on a rotation direction of the gauge gear 2. A point P1 is positioned on the front flank of the gauge gear 2, in a vicinity of a tooth root. The point P1 is positioned on one end portion of the tooth of the gauge gear 2 in the face width direction of the gauge gear 2. The point P1 comes in contact with a point positioned in a vicinity of a tooth tip of the test gear 1. A point P2 is positioned on the rear flank of the tooth of the gauge gear 2, in a vicinity of a tooth tip. The point P2 is positioned on the other end portion of the tooth of the gauge gear 2 in the face width direction of the gauge gear 2. The point P2 comes in contact with a point positioned in a vicinity of a tooth root of the test gear 1.

In case that one gauge gear 2 is used to measure the test gears 1 having different shapes, the face width of the gauge gear 2 is not always identical to that of the test gear 1. The face width of either one of the gauge gear 2 and the test gear 1 is smaller than the other one. Considering an efficiency in downsizing the measuring apparatus, it is ideal that the face width of the gauge gear 2 is smaller than that of the test gear 1. In case that the face width of the gauge gear 2 is smaller than that of the test gear 1, when the gauge gear 2 is inclined relative to the test gear 1, an end portion of the gauge gear 2 in the face width direction comes in contact with the test gear 1. It is ideal that the end portion of the gauge gear 2 comes in contact with, that is, interferes with the test gear 1 immediately after the second rotation axis X2 is inclined relative to the first rotation axis X1. The sooner this interference arises, the easier the changes in the direction between the first rotation axis X1 and the second rotation axis X2 are measured. Consequently, a so called ordinary spur gear having the rectangular-shaped cross section as explained above may be used as the gauge gear 2. In case that the ordinary spur gear is used as the gauge gear 2, however, the gauge gear 2 and the test gear 1 do not come in contact with each other smoothly. There is a possibility that the measurement values of the distance between the first rotation axis X1 and the second rotation axis X2 include small fluctuations because the test gear 1 and the gauge gear 2 come in contact with each other intermittently.

(Other example of the gauge gear 2) In order to achieve a smooth engagement between the test gear 1 and the gauge gear 2, for example, "a helical gear" may be used as the gauge gear 2. Teeth of the helical gears are inclined relative to a circumferential direction of the rotation. And thus the tooth tip of each tooth is arranged in a helical pattern on an outer circumferential surface of the gear. In a case that the helical gear is used as the gauge gear 2 and a simple spur gear is used as the test gear 1, a tooth of the gauge gear 2 engages with corresponding two adjacent teeth, that is, the two teeth that are adjacent to each other, of the test gear 1 deeply enough at a central portion of the test gear 1 in the face width direction. On the contrary, at end portions of the test gear 1 in the face width direction, a shallow engagement is achieved between the tooth of the gauge gear 2 and the two adjacent teeth of the test gear 1. In case that the helical gear is used as the gauge gear 2, the inclination angle of the second rotation axis X2 of the gauge gear 2 relative to the first rotation axis X1 of the test gear 1 is set to be a large angle from the beginning of the measurement so that a direction of a tooth space of the gauge gear 2 conforms to that of the test gear 1. In this case, the tooth of the gauge gear 2 largely slides in the direction of the tooth space relative to the test gear 1. As a result, the rotations of the gauge gear 2 and the test gear 1 are extremely smooth, which improves a contact ratio between the gauge gear 2 and the test gear 1. Thus, the contact ratio is improved by adjusting the inclination angle and by selecting an appropriate gear gage 2, which enables the measurement of the geometric shape of a gear which is often used in a harmonic drive system and whose involute tooth profile is small in an area.

Figure 3:
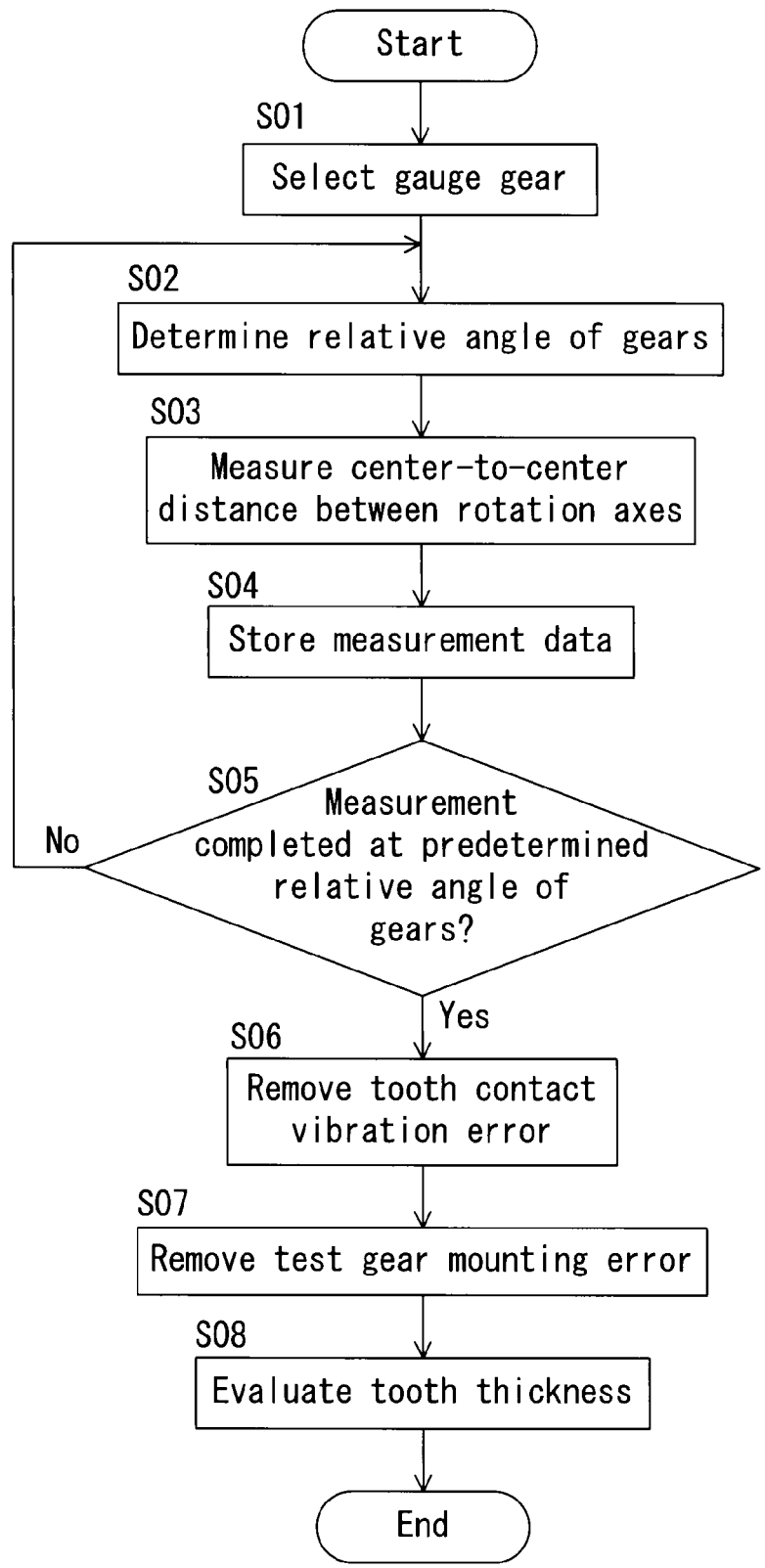
FIG. 3 is a flowchart of procedures for measuring the gear shape according to the embodiments.

(Measurement) Procedures of the measurements of the gear shape measuring apparatus according to the embodiment of this disclosure will be explained hereunder with reference to FIGS. 3 to 5.

First, the gauge gear 2 to be used for the measurement is selected in accordance with the test gear 1 and is mounted on the measuring apparatus (S01). Next, the first rotation axis X1 of the test gear 1 and the second rotation axis X2 of the gauge gear 2 are arranged so as to be parallel to each other, that is, a relative angle of the test gear 1 and the gauge gear 2 is determined, (S02). The motor M starts operating, and the test gear 1 is driven and rotated for or at least 360 degrees (S03). A total number of rotations of the motor M is measured by the measuring instrument 8 including, for example, the potentiometer provided at the motor M. After the gear shape is measured, a measurement data is processed. The measurement data corresponding to one rotation, that is, a rotation for 360 degrees, of the motor M is defined as one unit. In case that the measurement data corresponding to several units is processed, the most probable measurement data is used by following a general processing method, for example, by computing the averages. As the test gear 1 is rotated, the total number of rotations of the test gear 1, the measured values of the distance between the first rotation axis X1 and the second rotation axis X2 that vary corresponding to rotational phases, and data related to the ambient temperature at the time of measurement are stored in the measurement data processing portion 19 (S04). The measurement and the data storage are repeated by using different inclination angles of the second rotation axis X2 relative to the first rotation axis X1 accordingly (S05). The inclination angle of the second rotation axis X2 relative to the first rotation axis X1 may be set at, for example, −1.0 degree, −0.5 degrees, 0 degrees, +0.5 degrees, +1.0 degree and the like. Here, a symbol − or + located before each numerical value shows a direction in which the adjustment dial 13 is turned, that is, whether the adjustment dial 13 is turned to the left or right. Thus, the adjustment dial 13 is turned in the identical direction when the numerical values are preceded by the identical symbol. The inclination angle of the second rotation axis X2 relative to the first rotation axis X1 is appropriately set considering a combination of the test gear 1 and the gauge gear 2 so that the measurement result changes clearly enough in response to the change in the inclination angle.

Figure 4:
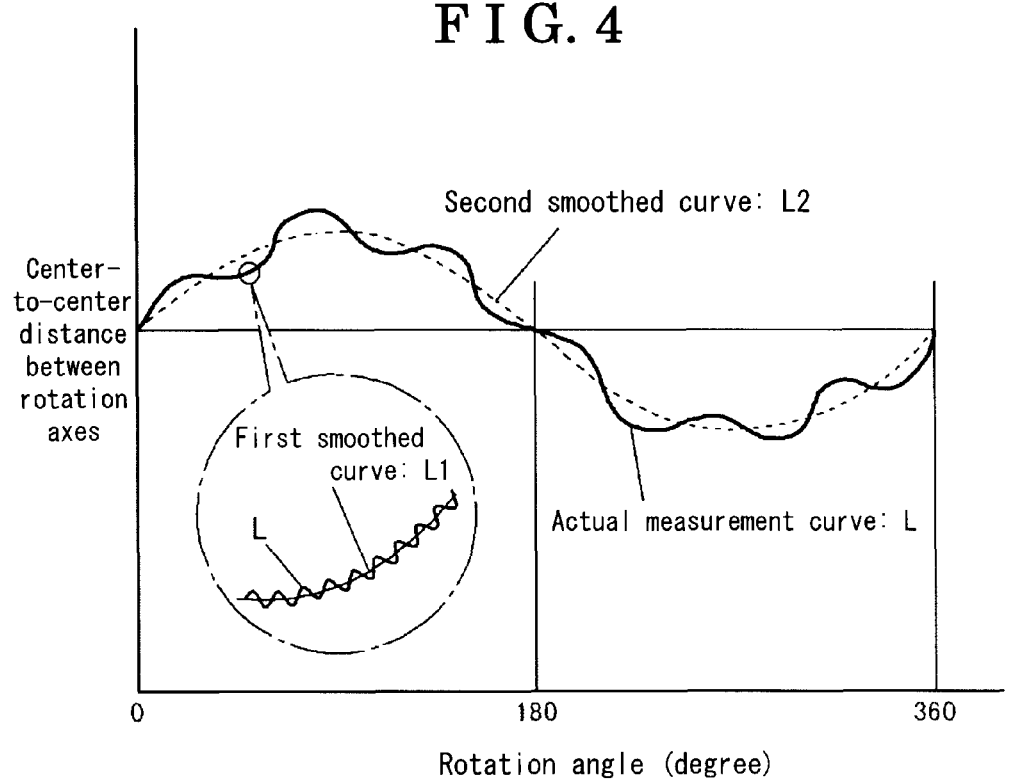
FIG. 4 is a graph showing an example of an obtained data.

In FIG. 4, the horizontal axis refers to the rotation angle of the test gear 1 and the vertical axis refers to the distance between the first rotation axis X1 and the second rotation axis X2. The measurement date may include errors attributed to various reasons, therefore, procedures are taken in order to remove each error. As shown in FIG. 4, an actual measurement curve L obtained from the measurement of the distance between the first rotation axis X1 and the second rotation axis X2 includes minor fluctuations. The fluctuations are attributed to errors caused by minor vibrations occurring every time when the test gear 1 engages with the gauge gear 2. The larger the inclination angle of the second rotation axis X2 relative to the first rotation axis X1 is, the more the minor vibrations are likely to occur because the gauge gear 2 and the test gear 1 come in contact with each other less smoothly. First, the minor vibrations, that is, tooth contact vibrations, are removed by performing a filtering on the actual measurement curve L to obtain a first smoothed curve L1 indicated by the smooth full line in FIG. 4 (S06 in FIG. 3). The first smoothed curve L1 is similar to a sinusoidal curve in its overall shape and includes waves appearing in a cycle of several tens of degrees, that is, every several tens of degrees of the rotation angle of the test gear 1. Next, a second filtering is performed on the first smoothed curve L1 so that the first smoothed curve 1L includes a shape even closer to that of the sinusoidal curve. Thus, a second smoothed curve L2 (the dashed line shown in FIG. 4) is obtained.

A bending appearing in the second smoothed curve L2 is attributed to fluctuations in the distance between the first rotation axis X1 and the second rotation axis X2 that were caused by an eccentric mounting of the test gear 1 on the supporting unit 3. One cycle of the fluctuation corresponds to one rotation of the test gear 1. In order to remove sinusoidal components from the second smoothed curve L2, average of the second smoothed curve L2 is computed and a corrected second smoothed curve L2' is obtained (the substantially straight dashed line shown in FIG. 5). In other words, the values of the corrected second smoothed curve L2' refer to a net distance between the first rotation axis X1 and the second rotation axis X2. By removing the sinusoidal components from the second smoothed curve L2, the errors attributed to the mounting of the test gear 1 on the supporting unit 3 are removed. (S07 in FIG. 3). In other words, a curve similar to the corrected second smoothed curve L2' is normally obtained if there is no misalignment of the rotation axis of the test gear 1. In a manner similar to the development of the corrected second smoothed curve L2', a corrected first smoothed curve L1' (the wavy full line shown in FIG. 5) is obtained. A difference between the corrected second smoothed curve L2' and the corrected first smoothed curve L1' in a direction of the vertical axis is equal to a difference between the first smoothed curve L1 and the second smoothed curve L2 in FIG. 4. FIG. 5 shows the corrected first smoothed curves L1' and the corrected second smoothed curves L2' which were obtained when the second rotation axis X2 is inclined relative to the first rotation axis X1 by 0 degrees, +0.5 degrees and +1.0 degree.

(Evaluation of the tooth thickness) In order to evaluate the tooth profile of the test gear 1, the thickness per tooth, a variation of the tooth thickness between two adjacent teeth and the like are evaluated. The evaluation of the tooth thickness (S8 in FIG. 3) is conducted based on whether or not the measured values of the distance between the first rotation axis X1 and the second rotation axis X2 are deviated from a known data, that is, a reference data, or based on how much deviation is present. In other words, the measurement data processing portion 19 detects a deviation between the reference data and the measurement data. The known data is obtained in advance by conducting a measurement on a master gear having a target shape of the test gear 1 and then stored. The distance between the first rotation axis X1 and the second rotation axis X 2 is defined, for example, when flanks of a tooth of the gauge gear 2 are in contact with the corresponding two teeth of the test gear 1 respectively. At this time, the flanks of the teeth of the gauge gear 2 and the two teeth of the test gear 1 are in contact with each other in linear areas. Because the basic specifications of the test gear 1 and the gauge gear 2 are known, only the tooth thickness of the test gear 1 is an unknown value which will be determined. The tooth thickness may be measured in a state where the test gear 1 and the gauge gear 2 are stopped. However, considering the errors, for example, which are attributed to the mounting of the test gear 1 on the supporting unit 3, it is ideal that the test gear 1 is rotated by at least 360 degrees and the average of the thickness of the teeth along the whole circumference of the test gear 1 is obtained.

Figure 5:
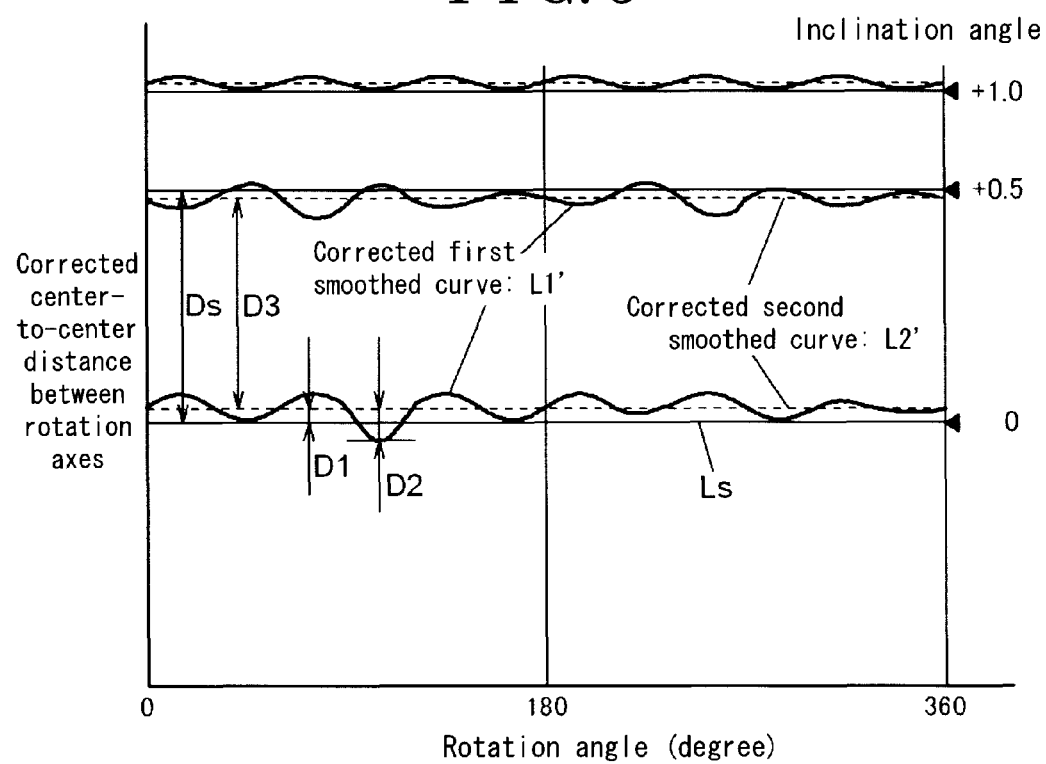
FIG. 5 is a graph showing an example of a method of processing the obtained data.

First, among the curves shown in the graph of FIG. 5, a center-to-center distance curve Ls and the corrected second smoothed curve L2' when the inclination angle of the gauge gear 2 relative to the test gear 1, that is, the inclination angle of the second rotation axis X2 relative to the first rotation axis X1, is 0 degrees, which are positioned lowermost in the graph, are focused on. Here, a difference D1 between the corrected second smoothed curve L2' and the center-to-center distance curve Ls that is obtained in advance by using the master gear and is stored as a reference center-to-center distance is evaluated. In FIG. 5, the corrected second smoothed curve L2' is positioned above the center-to-center distance curve Ls. This means that, the tooth thickness of the test gear 1 is larger, and thus the distance between the first rotation axis X1 and the second rotation axis X2 is slightly larger than the reference center-to-center distance. However, the difference D1 presents substantially no problem when the difference D1 is within an acceptable range of the difference. According to the measuring apparatus of the embodiment, a first threshold that indicates an acceptable distance is stored in advance, and it is determined whether or not the difference D1 is acceptable in accordance of the first threshold.

Further, a difference D2 between the corrected second smoothed curve L2' and the corrected first smoothed curve L1' is evaluated. The corrected first smoothed curve L1' includes the actual errors of the tooth profile of individual teeth. The corrected first smoothed curve L1' indicates fluctuations in a constant cycle (refer to the thick full lines in FIG. 5). The fluctuations are caused by, for example, the errors of the geometric shape of the test gear 1. The errors appearing in a cycle of several degrees or of several tens of degrees of the rotation angle of the test gear 1 are often attributed to failures related to the tools. The failures include, for example, errors in a feed motion of a rack tool, a runout of a pinion cutter or the like that may occur while machining the teeth. The failures also include errors occurring when rotating and feeding a work piece during a hobbing operation. Thus, the variation of the tooth thickness is evaluated based on whether or not the difference D2 exceeds a second threshold that is stored in advance. In a similar way, the evaluation of the tooth thickness is conducted when the inclination angle of the second rotation axis X2 relative the first rotation axis X1 is set at +0.5 degrees and at +1.0 degree.

Next, the tooth thickness is evaluated based on a gap D3 between the corrected second smoothed curve L2' when the inclination angle of the second rotation axis X2 relative to the first rotation axis X1 is set at 0 degrees and the corrected second smoothed curve L2' when the inclination angle is set at +0.5 degrees. The gap D3 indicates a range of the change in the distance between the first rotation axis X1 and the second rotation axis X2 when measuring the test gear 1 after increasing the inclination angle between the first rotation axis X1 and the second rotation axis X2 by 0.5 degrees. In case that the test gear 1 includes the involute tooth profile, the gap D3 changes depending on a magnitude of a pressure angle of the tooth. When the tooth 1 has a small pressure angle, the tooth thickness differs to a small extent between the tooth root and the tooth tip, that is, an angle of obliquity of the tooth is small. On the contrary, when the tooth has a large pressure angle, the tooth thickness differs to a large extent between the tooth root and the tooth tip, that is, the angle of obliquity of the tooth is large. Therefore, when the inclination angle of the second rotation axis X2 relative to the first rotation axis X1 is changed by a predetermined degree, the smaller the difference in the tooth thickness between the tooth root and the tooth tip is, the farther the second rotation axis X2 and the first rotation axis X1 are separated from each other. In case that the pressure angle of the gear is small, a so-called deep valley is formed between the teeth. Thus, the tooth of the gauge gear 2 comes to interfere with the two adjacent teeth of the test gear 1 when the gauge gear 2 is inclined only slightly. In order to clear the interference, the gauge gear 2 moves away from the test gear 1. If the geometric shape of the test gear 1 is finished in accordance with that of the master gear, there will be no large difference between the gap D3 and a reference gap Ds which refers to a reference value of the gap D3. A third threshold that indicates an acceptable range of the reference gap Ds is stored in advance. The evaluation of the tooth thickness at each inclination angle of the second rotation axis X2 relative to the first rotation axis X1 is actually completed by completing the evaluation of the difference D1. Therefore, the evaluation of the gap D3 with reference to the reference gap Ds may be conducted for a supplemental purpose. In case that the evaluation of the gap D3 with reference to the reference gap Ds is conducted, it is ideal that a gap between the corrected second smoothed curves L2' when the inclination angle of the second rotation axis X2 relative to the first rotation axis X1 is set at +0.5 degrees and at +1.0 degree.

By using the gear shape measuring apparatus, the variation of, for example, the tooth thickness of the two adjacent teeth is evaluated. The corrected first smoothed curve L1' when the inclination angle of the second rotation axis X2 relative to the rotation axis X1 is set at 0 degrees is focused on (FIG. 5). The corrected first smoothed curve L1' includes repetitive fluctuations while the rotation angle increases from 0 degrees to 350 degrees. This means that the tooth thickness increases at a certain rotation angle and decreases at a certain rotation angle of the test gear 1. In other words, the variation of the tooth thickness exists among the teeth in a circumferential direction of the test gear 1. The variation of the tooth thickness reflects, for example, characteristics of a cutting machine, a cutter or the like that is used for machining the gear. Therefore, causes of the errors of the tooth thickness are more easily identified by verifying a cycle of the variations. Thus, the geometric shape of the gear is evaluated efficiently and accurately by using the gear shape measuring apparatus according to the embodiment.

(Other embodiment) (1) In order to push the test gear 1 against the gauge gear 2, a gravity type mechanism instead of the biasing member 15 may be used. For example, the first rotation axis X1 of the test gear 1 and the second rotation axis X2 of the gauge gear 2 may be arranged in an inclined manner so that the gauge gear 2 is positioned above the test gear 1. Thus, the gauge gear 2 is pushed against the test gear 1. A pushing force pushing the gear 2 against the test gear 1 may be adjusted by changing an inclination angle of the gear shape measuring apparatus. Alternatively, the first rotation axis X1 and the second rotation axis X2 are arranged so as to extend in a horizontal direction in a manner that the second rotation axis X2 is mounted on the first rotation axis X1 from above. In this case, the pushing force may be adjusted by changing a position of the gauge gear 2 relative to the test gear 1, that is, by making the gauge gear 2 orbit about the test gear 1 by an appropriate angle.

(2) In order to measure the distance between the first rotation axis X1 of the test gear 1 and the second rotation axis X2 of the gauge gear 2, a measuring mechanism of an optical type may be used instead of the measuring mechanism of a dial gauge type which is explained above. The measuring mechanism of the optical type may include for example a light projector provided at the measuring portion and a reflector provided at the supporting unit 3. In case that the measuring mechanism of the dial gauge type is used, backlash or the like may occur on a gear portion of the measuring apparatus. In case that the measuring mechanism of the optical type is used, however, mechanical errors including the backlash are restricted from occurring.

(3) The test gear 1 may be, for example, an internal gear formed into a ring shape of which the tooth thickness is to be measured. In this case, for example, a shape of the fork-shaped member may be changed so that the fork-shaped member is inserted into the inside of the internal gear from the axial direction of the internal gear.

The gear shape measuring apparatus according to the embodiments is for inspecting the tooth thickness of various gears including a hobbed gear, a rolled gear and the like, and thus is useful in many industrial machinery fields. The gear shape measuring apparatus according to the embodiments may measure the gear that is individually mounted on the gear shape measuring apparatus. Alternatively, the gear shape measuring apparatus according to the embodiments may be installed inside the gear hobber or other processing machine so that the tooth thickness of a subject work piece is measured while being machined.

According to the embodiments, the gear shape measuring apparatus includes the supporting unit 3 adapted to support the test gear 1 so as to be rotatably driven about the first rotation axis X1, the gauge gear 2 being rotatable about the second rotation axis X2 while engaging with the test gear 1, the inter-axis angle setting portion 9 for adjusting and setting the relative inclination angle between the first rotation axis X1 and the second rotation axis X2, and allowing the distance between the first rotation axis X1 and the second rotation axis X2 to be changed, the biasing member 15 biasing the gauge gear 2 against the test gear 1, the center-to-center distance measuring portion 17 measuring the distance between the first rotation axis X1 and the second rotation axis X2, and the measurement data processing portion 19 processing the measurement data.

Due to the above described structure, the first rotation axis X1 and the second rotation axis X2 are parallel to each other when measuring the test gear 1. The distance between the first rotation axis X1 and the second rotation axis X 2 is defined, for example, when the flanks of the tooth of the gauge gear 2 are in contact with the corresponding two teeth of the test gear 1 respectively. At this time, the flanks of the teeth of the gauge gear 2 and the two teeth of the test gear 1 are in contact with each other in linear areas. Because the basic specifications of the test gear 1 and the gauge gear 2 are known, only the tooth thickness of the test gear 1 is an unknown value which will be determined. The tooth thickness may be measured in a state where the test gear 1 and the gauge gear 2 are stopped. However, considering the errors, for example, which are attributed to the mounting of the test gear 1 on the supporting unit 3, it is ideal that the test gear 1 is rotated by at least 360 degrees and the average of the thickness of the teeth along the whole circumference of the test gear 1 is obtained.

Due to the above described structure, the tooth thickness of the test gear 1 is measured accurately. A depth of the engagement between the test gear 1 and the gauge gear 2 is adjusted by changing the distance between the first rotation axis X1 and the second rotation axis X2 because the inclination angle of the second rotation axis X2 relative to the first rotation axis X1 is adjustable. For example, the test gear 1 and the gauge gear 2 start interfering with each other when the inclination angle between the second rotation axis X2 and the first rotation axis X1 is made larger than a normal angle, and thus the engagement between the test gear 1 and the gauge gear 2 becomes shallower. In order to clear the interference, the distance between the first rotation axis X1 and the second rotation axis X2 necessarily becomes larger. An increment in the distance between the first rotation axis X1 and the second rotation axis X2, which is caused in response to the inclination angle between the second rotation axis X2 and the first rotation axis X1, is affected by the tooth profile. For example, when the tooth thickness differs to a small extent between the tooth root and the tooth tip, the increment in the distance between the first rotation axis X1 and the second rotation axis X2 is larger than when the tooth thickness differs to a large extent between the tooth root and the tooth tip. In other words, in case that a circumferential distance between the two adjacent teeth differs to a small extent between in a vicinity of the tooth root and in a vicinity of the tooth tips, the gauge gear 2 needs to be moved away from the test gear 1 by a large extent in order to make the gauge gear 2 inclined by a certain degree.

An extent of the increment in the distance between the first rotation axis X1 and the second rotation axis X2, which corresponds to the inclination angle of the second rotation axis X2 relative to the first rotation axis X1, presents another characteristic in case that the gear has different tooth thickness between a central portion and end portions of the tooth in the face width direction. In case that the test gear 1 and the gauge gear 2 each includes a larger tooth thickness at the central portion of the tooth than at the end portions of the tooth in the face width direction, when the first rotation axis X1 and the second rotation axis X2 are parallel to each other, a point contact is established between the central portion of the tooth of the test gear 1 and the central portion of the tooth of the gauge gear 2. The distance between the first rotation axis X1 and the second rotation axis X2, in this state, is determined. Here, it is assumed that a first contact point between one of the flanks of the tooth of the gauge gear 2 and the corresponding tooth of the test gear 1, and that a second contact point between the other one of the flanks of the tooth of the gauge gear 2 and the corresponding tooth of the test gear 1 are located at an identical height from a tooth root surface of the gauge gear 2. In this state, as the gauge gear 2 is gradually made to incline, the first contact point moves toward one end of the tooth in the face width direction and the second contact point moves toward the other end of the tooth in the face width direction. The movements of the first and second contact points are realized by that the gauge gear 2 moves away from the test gear 1. This is because the gauge gear 2 necessarily moves away from the test gear 1 when the tooth of the gauge gear 2 is forcibly moved between the two teeth of the test gear 1. Thus, a height at which the tooth of the gauge gear 2 and the corresponding teeth of the test gear 1 come in contact with each other may be changed by changing the inclination angle of the second rotation axis X2 relative to the first rotation axis X1.

However, the above-explained change of the contact point takes place when the gear having a certain geometric shape is used. The above-explained change of the contact point is realized as long as the engagement between the test gear 1 and the gauge gear 2 is maintained when the second rotation axis X2 of the gauge gear 2 is inclined relative to the first rotation axis X1 of the test gear 1. In addition, the rotations of the first rotation axis X1 and the second rotation axis X2 loose smoothness depending on the gear shapes of the test gear 1 and the gauge gear 2. However, as explained above, in a state where the second rotation angle X2 is inclined relative to the first rotation axis X1, if the rotation of the test gear 1 is transmitted to the gauge gear 2 and if the distance between the first rotation axis X1 and the second rotation axis X2 is changed even just slightly, the tooth thickness of the test gear 1 is measured. As explained above, according to the gear shape measuring apparatus of the embodiments, the tooth profile from the tooth root to the tooth tip is grasped by evaluating the inclination angle of the second rotation axis X2 relative to the first rotation axis X1 and the current distance between the first rotation axis X1 and the second rotation axis X2, and thus the tooth thickness is measured at various points along the tooth depth.

According to the embodiments, the inter-axis angle setting portion 9 includes the gear axis supporting portion 9a supporting the gauge gear 2 and the base end axis supporting portion 9b supporting the gear axis supporting portion 9a on the sliding portion 10 of the gear shape measuring apparatus in a manner that the base end axis supporting portion 9b is rotatable. The sliding portion 10 is slidable in the direction in which the second rotation axis X2 moves close to or away from the first rotation axis X1. The rotation axis of the base end axis supporting portion 9b intersects with the second rotation axis X2 at the central location of the gauge gear 2 in the face width direction of the gauge gear 2 and intersects with the first rotation axis X1.

(Effects) Due to the above described structure, the gauge gear 2 is supported by the sliding portion 10 in a manner that the gauge gear 2 is rotatable about the rotation axis of the base end axis supporting portion 9b, and the rotation axis of the base end axis supporting portion 9b is always maintained perpendicular to the first rotation axis X1 and to the second rotation axis X2. Consequently, the contact position between the gauge gear 2 and the test gear 1 remains unchanged when the inclination angle of the gauge gear 2 relative to the test gear 1, that is, the inclination angle of the second rotation axis X2 relative to the first rotation axis X1, is changed. And thus, the inclination angle is changed in the smoothest way. In addition, when the inter-axis angle setting portion 9 moves close to or away from the test gear 1, the direction of the movement of the inter-axis angle setting portion 9 is perpendicular to the first rotation axis X1 and to the second rotation axis X2. Consequently, the measurement result obtained by the center-to-center distance measuring portion 17 as it is, refers to the distance between the first rotation axis X1 and the second rotation axis X2, which makes the calculation to be performed later extremely simple.

According to the embodiments, the measurement data processing portion 19 includes the reference data obtained in advance by conducting the measurement on the master gear having the target shape of the test gear 1 by using the gauge gear 2. The measurement data processing portion 19 is structured so that the deviation between the reference data and the measurement data is calculated.

(Effects) Due to the above described structure, the gauge gear 2 may be used for inspecting the test gears whose geometric shapes are different from each other to some extent as long as the module or the like of the test gear 1 is identical to that of the gauge gear 2. However, calculating the shape of the test gear 1 based on the specification or the like of the test gear 1 will make the inspection work complicated. Therefore, the measurement is conducted in advance by using the master gear, which serves as the reference gear of the test gear 1, and the data obtained from the measurement is stored as a representative data. After this, the test gear 1 is measured and the obtained data of the test gear 1 is compared relative to the representative data. Thus, the geometric shape of the test gear 1 is inspected easily.

According to the embodiments, the gear shape measuring apparatus includes the temperature measuring portion 18 measuring the temperatures the test gear 1 and the gauge gear 2. The distance between the first rotation axis X1 and the second rotation axis X2 measured by the center-to-center distance measuring portion 17 is corrected in accordance with the output from the temperature measuring portion 18.

(Effects) The temperatures of the test gear 1 and the gauge gear 2 may change as an environmental temperature changes, resulting in changes in a diameter of each tooth. Due to the above described structure, the temperatures of the test gear 1 and the gauge gear 2 are measured and the distance between the first rotation axis X1 and the second rotation axis X2 measured at the center-to-center distance measuring portion 17 is corrected in accordance with the measured temperatures. As a result, a measurement precision of the tooth thickness of the test gear 1 and the gauge gear 2 improves.

According to the embodiments, the center-to-center distance measuring portion 17 measures the distance between the first rotation axis X1 and the second rotation axis X2 according to the movement of the sliding portion 10.

Due to the above described structure, the sliding portion 10 is movable in the extremely smooth manner. Consequently, even the minor change in the distance between the first rotation axis X1 and the second rotation axis X2 is detected.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A gear shape measuring apparatus comprising:
a supporting unit adapted to support a test gear so as to be rotatably driven about a first rotation axis;
a gauge gear being rotatable about a second rotation axis while engaging with the test gear;
an inter-axis angle setting portion for adjusting and setting a relative inclination angle between the first rotation axis and the second rotation axis, and allowing a distance between the first rotation axis and the second rotation axis to be changed;
a biasing member biasing the gauge gear against the test gear;
a center-to-center distance measuring portion measuring the distance between the first rotation axis and the second rotation axis; and
a measurement data processing portion processing a measurement data.

2. The gear shape measuring apparatus according to claim 1, wherein
the inter-axis angle setting portion includes a gear axis supporting portion supporting the gauge gear and a base end axis supporting portion supporting the gear axis supporting portion on a sliding portion of the gear shape measuring apparatus in a manner that the base end axis supporting portion is rotatable, the sliding portion being slidable in a direction in which the second rotation axis moves close to or away from the first rotation axis, and wherein
the rotation axis of the base end axis supporting portion intersects with the second rotation axis at a central location of the gauge gear in a face width direction of the gauge gear, and intersects with the first rotation axis.

3. The gear shape measuring apparatus according to claim 1, wherein
the measurement data processing portion includes a reference data obtained in advance by conducting a measurement on a master gear having a target shape of the test gear by using the gauge gear, and wherein
the measurement data processing portion is structured so that a deviation between the reference data and the measurement data is calculated.

4. The gear shape measuring apparatus according to claim 1 further comprising:
a temperature measuring portion measuring temperatures of the test gear and the gauge gear, wherein the distance between the first rotation axis and the second rotation axis measured by the center-to-center distance measuring portion is corrected in accordance with an output from the temperature measuring portion.

5. The gear shape measuring apparatus according to claim 1, wherein the center-to-center distance measuring portion measures the distance between the first rotation axis and the second rotation axis according to a movement of the sliding portion.

6. A gear profile verifying apparatus comprising:
a supporting unit adapted to support and drive a test gear for rotation about a first rotation axis;
a gauge gear adapted to engage with the test gear for rotation about a second rotation axis;
an inter-axis angle setting portion for adjusting and setting a relative inclination angle between the first rotation axis and the second rotation axis, and allowing a distance between the first rotation axis and the second rotation axis to be changed;
a biasing member biasing the gauge gear against the test gear,
a center-to-center distance measuring portion measuring the distance between the first rotation axis and the second rotation axis; and
a measurement data processing portion processing a measurement data.

7. The gear profile verifying apparatus according to claim 6, wherein the inter-axis angle setting portion includes a gear axis supporting portion supporting the gauge gear and a base end axis supporting portion supporting the gear axis supporting portion on a sliding portion of the gear shape measuring apparatus in a manner that the base end axis supporting portion is rotatable, the sliding portion being slidable in a direction in which the second rotation axis moves close to or away from the first rotation axis, and wherein the rotation axis of the base end axis supporting portion intersects with the second rotation axis at a central location of the gauge gear in a face width direction of the gauge gear, and intersects with the first rotation axis.

8. The gear shape measuring apparatus according to claim 6, wherein the measurement data processing portion includes a reference data obtained in advance by conducting a measurement on a master gear having a target shape of the test gear by using the gauge gear, and wherein the measurement data processing portion is structured so that a deviation between the reference data and the measurement data is calculated.

9. The gear shape profile verifying apparatus according to claim 6 further comprising:
a temperature measuring portion measuring temperatures of the test gear and the gauge gear, wherein the distance between the first rotation axis and the second rotation axis measured by the center-to-center distance measuring portion is corrected in accordance with an output from the temperature measuring portion.

10. The gear profile verifying apparatus according to claim 6, wherein the center-to-center distance measuring portion measures the distance between the first rotation axis and the second rotation axis according to a movement of the sliding portion.

* * * * *